(12) United States Patent
Lu et al.

(10) Patent No.: US 7,123,304 B2
(45) Date of Patent: Oct. 17, 2006

(54) HINGE FOR AN LCD MONITOR OF A VIDEO MOVIE CAMERA

(75) Inventors: Sheng-Nan Lu, Shulin (TW); Tien-Yueh Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 871 days.

(21) Appl. No.: 10/304,766

(22) Filed: Nov. 27, 2002

(65) Prior Publication Data

US 2004/0100576 A1    May 27, 2004

(51) Int. Cl.
*H04N 5/222*    (2006.01)
(52) U.S. Cl. ............... 348/333.06; 348/373; 396/422; 396/428
(58) Field of Classification Search ........... 348/333.06; 248/177.1, 178.1, 179.1, 181.1, 181.2; 396/422, 396/428
See application file for complete search history.

(56) References Cited

U.S. PATENT DOCUMENTS

| 5,982,429 A | * | 11/1999 | Kamamoto et al. ..... 348/333.06 |
| 6,082,691 A | * | 7/2000 | Moriyasu .................. 248/274.1 |

* cited by examiner

*Primary Examiner*—Tuan Ho
*Assistant Examiner*—Anthony J. Daniels
(74) *Attorney, Agent, or Firm*—Troxell Law Office, PLLC

(57) ABSTRACT

A hinge for an LCD monitor of a video movie camera is composed of a vertical axle, a barrel, a horizontal axle, a positioning disk, two resilient dished washers, and a seat. The vertical axle is secured on the camera. The barrel is pivotally mounted on the vertical axle. The horizontal axle is rotatably mounted on the barrel. The positioning disk and the resilient dished washers are provided on an end of the horizontal axle. The seat is mounted at the other end of the horizontal axle and the LCD monitor is installed on the seat. The LCD monitor can be smoothly turned about the vertical axle and the horizontal axle, and be stably positioned at any desired positions.

5 Claims, 5 Drawing Sheets

HINGE FOR AN LCD MONITOR OF A VIDEO MOVIE CAMERA

BACKGROUND OF THE INVENTION

1. Field of the Invention

The present invention is related to an LCD monitor of a video movie camera, and more particularly to a hinge for an LCD monitor by which the LCD monitor can be rotated about a horizontal axis and a vertical axis.

2. Description of Related Art

A video movie camera generally has an LCD monitor pivotally mounted at a left side. A user can turn outwards the LCD monitor to watch images during filming whereby the user can be sure of what is being recorded. The LCD monitor can be turned about a vertical axis and a horizontal axis for adjustment. However, the LCD monitor pivotally mounted on the camera by a conventional hinge cannot be stably positioned at desired positions, so that the user needs to hold the LCD monitor with one hand, which is very inconvenient. Moreover, the LCD monitor is not rotated very easily and smoothly.

Therefore, the invention provides a hinge for the LCD monitor to mitigate and/or obviate the aforementioned problems.

SUMMARY OF THE INVENTION

The main objective of the invention is to provide a hinge by which an LCD monitor on a video camera can be stably positioned at any desired position.

Another objective of the invention is to provide a hinge by which the LCD monitor can be rotated easily and smoothly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
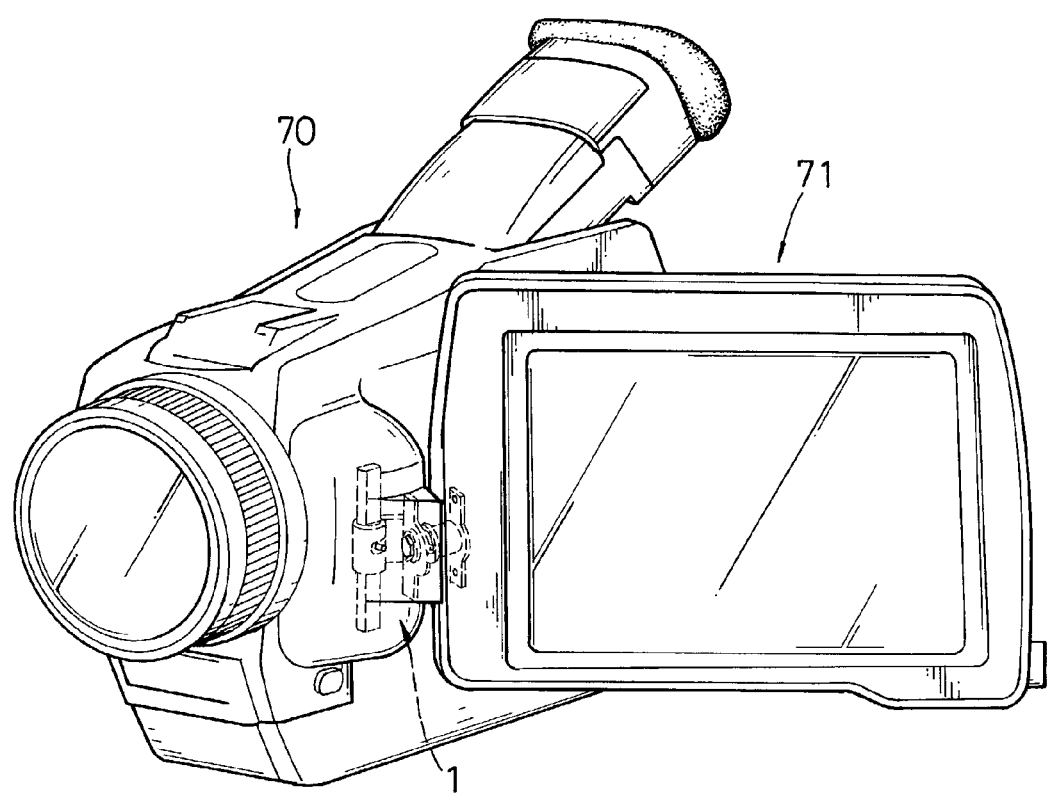
FIG. 1 is a perspective view of a video movie camera with a hinge in accordance with the invention.

Referring to FIG. 1, an LCD monitor (71) is pivotally mounted on a video movie camera (70) by a hinge (1) in accordance with the invention.

Figure 2:
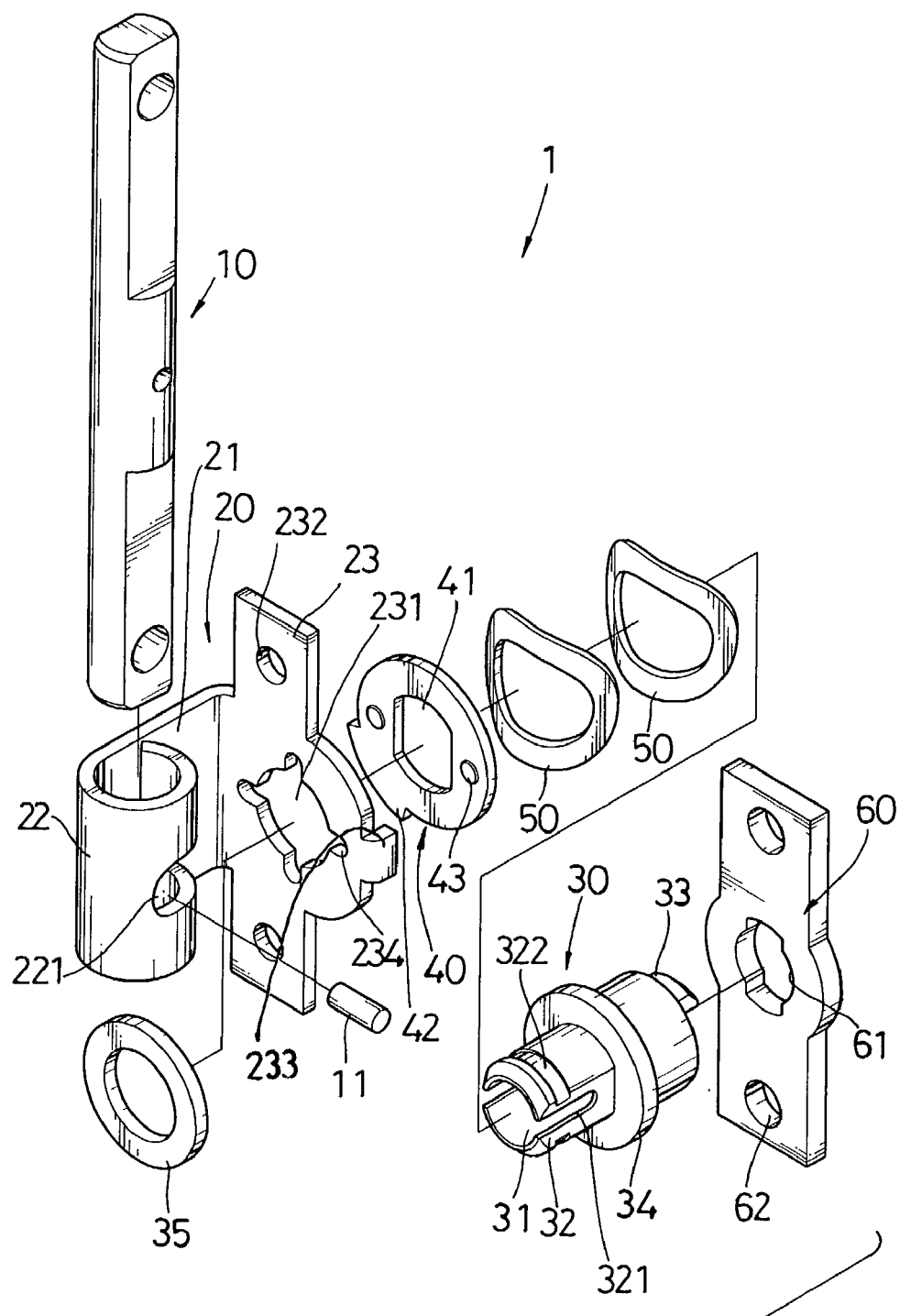
FIG. 2 is an exploded perspective view of the hinge in accordance with the invention.
Figure 3:
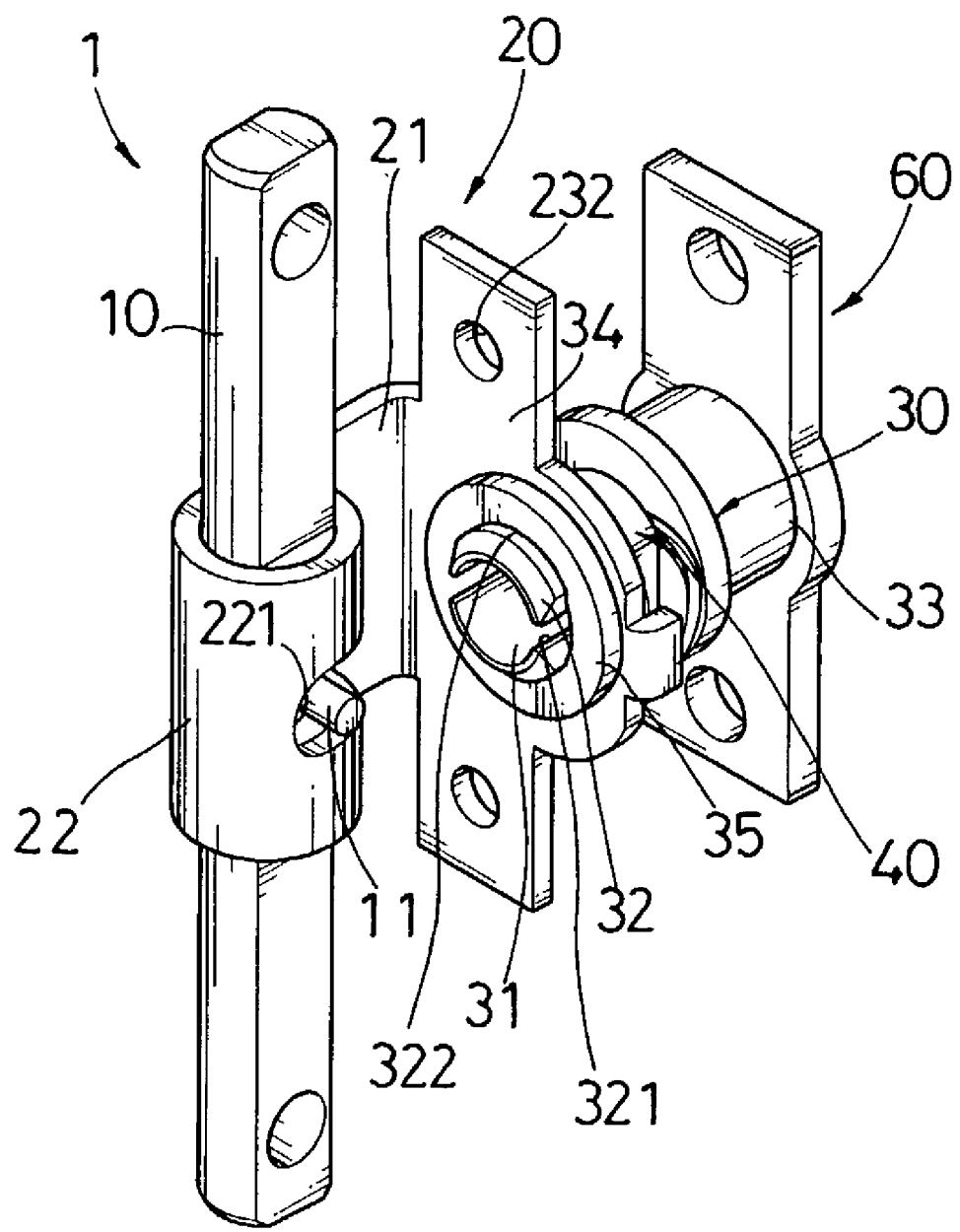
FIG. 3 is a perspective view of the hinge of FIG. 2.
Figure 4:
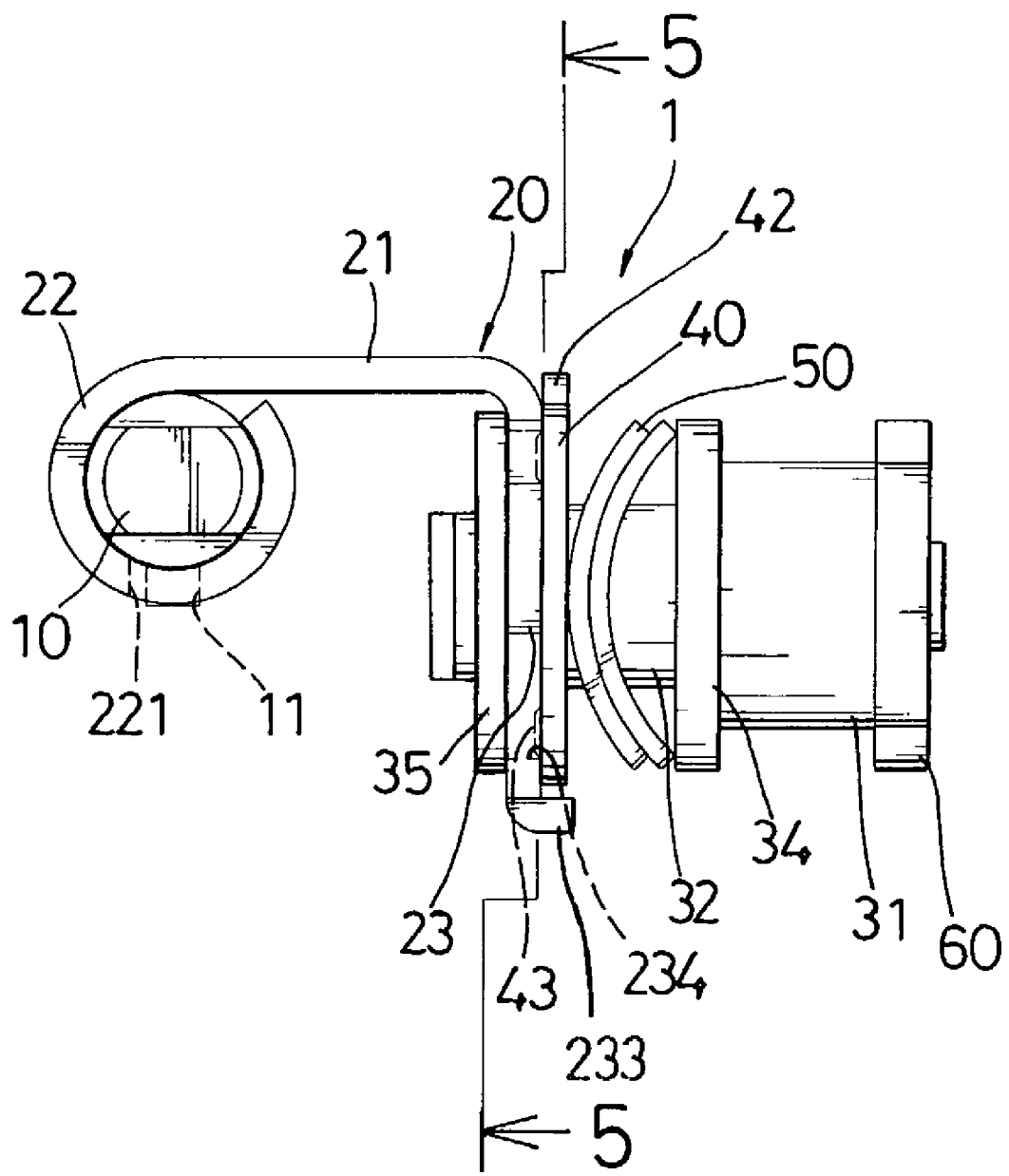
FIG. 4 is a top view of the hinge of FIG. 2.

Referring to FIGS. 2–4, the hinge (1) is composed of a vertical axle (10), a barrel (20), a horizontal axle (30), a positioning disk (40), two resilient dished washers (50), and a seat (60).

The vertical axle (10) is secured on the camera (70) and the barrel (20) is pivotally mounted on the vertical axle (10). The barrel (20) has a pivoting portion (21) and an installing portion (23) perpendicular to each other. A tubular part (22) is formed on the pivoting portion (21), and the vertical axle (10) extends through the tubular part (22). Thus, the barrel (20) can be pivoted about the vertical axle (10). A limit slot (221) is transversally defined through an outer periphery of the tubular part (22) for a pin (11) inserted in the vertical axle (10) and extending out from the limit slot (221).

The installing portion (23) has a first opening (231) defined therethrough. A plurality of cutouts (234) is evenly defined around the circumference of the first opening (231). An ear (233) is formed at a side of the installing portion (23) away from the pivoting portion (22). Two first apertures (232) are respectively defined above and below the first opening (231).

The horizontal axle (30) has a first end (32), a flange (34) formed at a middle portion thereof, and a second end (33). A passage (31) is longitudinally defined through the horizontal axle (30), and electrical wires (not shown or numbered) connecting the LCD monitor to the camera extends through the passage (31) and will not be twisted together in rotation of the horizontal axle (30). Two elongated slots (321) are longitudinally defined at opposite diametrical sides of the first end (32), and a step (322) is formed at an outer periphery of the first end (32). The first end (32) extends through the first opening (231) of the installing portion (23), and a ring (35) is provided at the first end (32) and secured by the step (322) to rotatably fasten the horizontal axle (30) on the installing portion (23).

Figure 6:
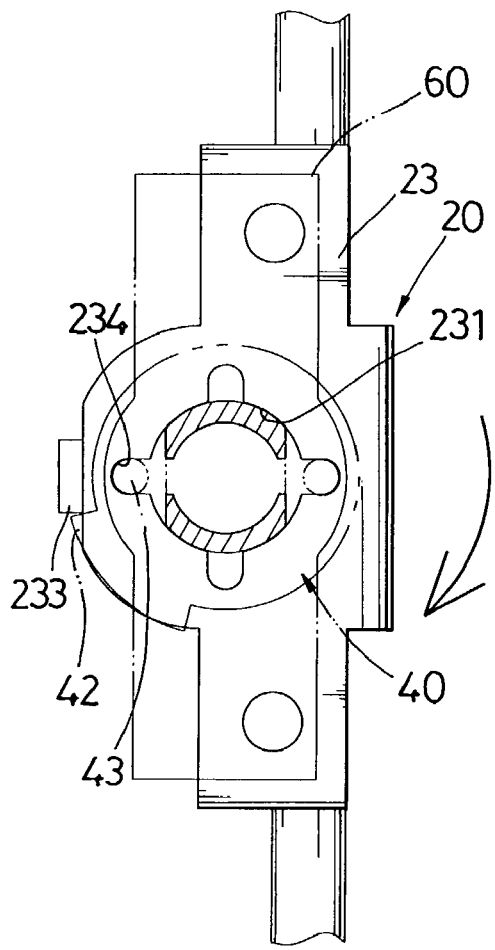
FIG. 6 is an operatically schematic view showing the hinge pivoting downwards about the horizontal axle.
Figure 5:
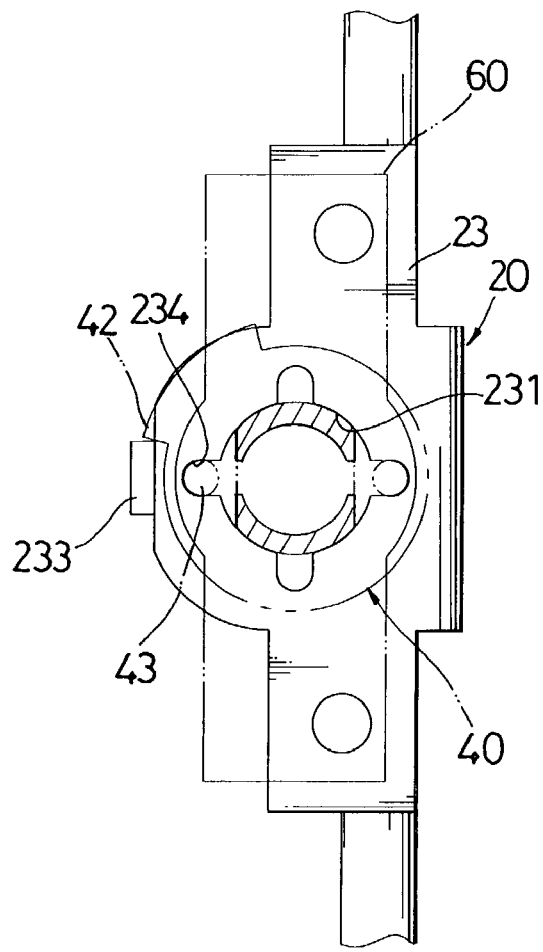
FIG. 5 is an operatically schematic view showing the hinge pivoting upwards about a horizontal axle.

The positioning disk (40) with a hole (41) is provided outside the horizontal axle (30) between the installing portion (23) and the flange (34). A stop (42) is formed at an outer circumference of the positioning disk (40), and at least one lug (43) is formed on a side of the positioning disk (40) facing the installing portion (23) and received in the opening (231). When the positioning disk (40) is clockwise/counter-clockwise rotated along with the horizontal axle (30), the stop (42) will be blocked by the ear (233), as shown in FIGS. 5 and 6. The lug (43) can be located in the corresponding cutout (234) to stably position the horizontal axle (30).

In another embodiment not shown, at least one lug is provide on the installing portion (23), and a plurality of cutouts is defined around the hole (41) of the positioning disk (40). The lug of the installing portion (23) also can be located in the corresponding cutouts of the positioning disk (40), which has the same effect and function.

Referring back to FIGS. 2–4, the resilient dished washers (50) are provided between the positioning disk (40) and the flange (34) to press the positioning disk (40) against the installing portion (23).

The seat (60) is mounted on the horizontal axle (30) by the second end (33) extending through a second opening (61) of the seat (60). Two second apertures (62) are respectively defined above and below the second opening (61). The LCD monitor (71) is secured on the seat (60) by fasteners (not shown or numbered).

Referring to FIGS. 1, 3, 5, and 6, the LCD monitor (71) can be pivoted outwards about the vertical axle (10) along with the barrel (20) and the horizontal axle (30). When the pin (11) in the limit slot (221) is blocked by the pivoting portion (21), the LCD monitor (71) reaches the maximum horizontal angle and cannot be pivoted outwards any further. Then the LCD monitor (71) can be pivoted upwards or downwards about the horizontal axle (30) until the stop (42) is blocked by the ear (233).

From the above description, it is noted that the invention has the following advantages:

1. A user can easily and smoothly turn the LCD monitor about the vertical axle and the horizontal axle to view the LCD monitor.

2. The horizontal axle has the passage provide therein, so that the wires will not be twisted during turning the LCD monitor.

3. The LCD monitor can be stably positioned at any desired position under the force of the resilient dished washers, and especially at the positions corresponding to the cutouts by means of locating the lug in the cutouts.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for an LCD monitor of a video movie camera comprising:
    a vertical axle (10) secured on the camera;
    a barrel (20) rotatably mounted on the vertical axle (10), the barrel (20) having a tubular part (22) formed on a pivoting portion (21) and the vertical axle (10) rotatably extending through the tubular part (22), an installing portion (23) substantially perpendicular to the pivoting portion (21), a first opening (231) defined through the installing portion (23), and an ear (233) formed at a side of the installing portion (23) away from the pivoting portion (21);
    a horizontal axle (30) rotatably mounted on the installing portion (23), the horizontal axle (30) having a passage (31) longitudinally defined through the horizontal axle (30), a first end (32) rotatably extending through the first opening (231), a flange (34) formed at a middle portion of the horizontal axle (30), and a second end (33);
    a positioning disk (40) provided outside the horizontal axle (30) between the installing portion (23) and the flange (34), the positioning disk (40) having a hole (41) for the horizontal axle (30) extending through, and a stop (42) formed at an outer circumference of the positioning disk (40);
    two resilient dished washers (50) provided between the positioning disk (40) and the flange (34) to press the positioning disk (40) against the installing portion (23); and
    a seat (60), on which the LCD monitor is secured, mounted on the horizontal axle (30), the seat (60) having a second opening (61) for the second end (33) of the horizontal axle (30) extending through the seat (60).

2. The hinge as claimed in claim 1, wherein the tubular part (22) has a limit slot (221) transversally defined at an outer periphery thereof, and the vertical axle (10) has a pin (11) inserted therein and extending out from the limit slot (221).

3. The hinge as claimed in claim 1, wherein the horizontal axle (30) has two elongated slots (321) defined at opposite diametrical sides of the first end (31), and a step (322) formed at the first end (31); and a ring (35) is provided at the first end (31) and secured by the step (322) to rotatably fasten the horizontal axle (30) in the first opening (231).

4. The hinge as claimed in claim 1, wherein the installing portion (23) has a plurality of cutouts (234) evenly defined around the circumference of the first opening (231); and the positioning disk (40) has at least one lug (43) formed on a side facing the installing portion (23), which can be located in the corresponding cutouts (234) for stably positioning the horizontal axle (30).

5. The hinge as claimed in claim 1, wherein the installing portion (23) has at least one lug formed on a side facing the positioning disk (40); and the positioning disk (40) has a plurality of cutouts evenly defined around the circumference of the hole (41), in which the lug can be located for stably positioning the horizontal axle (30).

* * * * *